United States Patent
Cho (10) Patent No.: US 8,711,418 B2
(45) Date of Patent: Apr. 29, 2014

(54) IMAGE FORMING APPARATUS AND METHOD OF TRANSLATING VIRTUAL MEMORY ADDRESS INTO PHYSICAL MEMORY ADDRESS

(75) Inventor: Byoung-tae Cho, Daejeon (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 251 days.

(21) Appl. No.: 13/209,712

(22) Filed: Aug. 15, 2011

(65) Prior Publication Data

US 2012/0038952 A1 Feb. 16, 2012

(51) Int. Cl.
*G06F 3/12* (2006.01)
*G06F 15/00* (2006.01)

(52) U.S. Cl.
USPC .......... 358/1.16; 358/1.1; 358/1.15; 358/1.18

(58) Field of Classification Search
USPC ............. 358/1.16, 1.1, 3.24, 3.23, 1.15, 1.17, 358/1.18, 530, 426.01, 444; 711/1, 2, 3, 5, 711/6, 100, 101, 108, 113, 111, 116, 118, 711/137, 145, 152, 153, 170, 171, 172, 173, 711/200, 202, 203, 205, 206, 209
See application file for complete search history.

(56) References Cited

U.S. PATENT DOCUMENTS

| 6,856,420 | B1 | 2/2005 | Pew et al. |
| 2003/0063316 | A1* | 4/2003 | Irino ............................ 358/1.16 |
| 2004/0139295 | A1* | 7/2004 | Arimilli et al. ................ 711/207 |
| 2008/0209130 | A1* | 8/2008 | Kegel et al. .................... 711/135 |
| 2009/0144508 | A1 | 6/2009 | Freimuth et al. |

FOREIGN PATENT DOCUMENTS

| EP | 1988467 | 11/2008 |
| GB | 2466981 | * 7/2010 |

OTHER PUBLICATIONS

Extended European Search Report issued Dec. 27, 2011 in EP Application No. 11177401.4.

* cited by examiner

*Primary Examiner* — Ngon Nguyen
(74) *Attorney, Agent, or Firm* — Stanzione & Kim, LLP (57) ABSTRACT

An image forming apparatus includes a function unit to perform functions of the image forming apparatus, and a control unit to control the function unit to perform the functions of the image forming apparatus. The control unit includes a processor core to operate in a virtual memory address, a main memory to operate in a physical memory address and store data used in the functions of the image forming apparatus, and a plurality of input/output (I/O) logics to operate in the virtual memory address and control at least one of the functions performed by the image forming apparatus. Each of the plurality of I/O logics translates the virtual memory address into the physical memory address corresponding to the virtual memory address and accesses the main memory.

8 Claims, 8 Drawing Sheets

| index | virtual address | physical address |
|---|---|---|
| 1 | 40000032 | 40000032 |
| 2 | 40001032 | 40001032 |
| 3 | 40002032 | 40002032 |
| ⋮ | ⋮ | ⋮ |

IMAGE FORMING APPARATUS AND METHOD OF TRANSLATING VIRTUAL MEMORY ADDRESS INTO PHYSICAL MEMORY ADDRESS

CROSS-REFERENCE TO RELATED APPLICATIONS

This application claims priority under 35 U.S.C. §119(a) from Korean Patent Application No. 10-2010-0078820, filed on Aug. 16, 2010, in the Korean Intellectual Property Office, the contents of which are incorporated herein by reference in its entirety.

BACKGROUND OF THE INVENTION

1. Field of the Invention

The present general inventive concept relates to an image forming apparatus and method of translating a virtual memory address into a physical memory address, and more particularly to, an image forming apparatus and method of translating a virtual memory address into a physical memory address to improve a delay caused in a process of translating the virtual memory address into the physical memory address.

2. Description of the Related Art

Image forming apparatuses are apparatuses which print data generated in a terminal, such as a computer, on a recording paper. As an example of the image forming apparatus, there is a copy machine, a printer, a facsimile, or a multi function peripheral (MFP) which includes functions and/or structures of the copy machine, the printer and the facsimile through one apparatus, or the like In general, since a program having a larger capacity than a capacity or size of a main memory cannot loaded in the memory using only a physical memory address space, it is impossible to execute the program having a large capacity. Since the program is sequentially executed in a processor, it is necessary that only a part of a code of the program required in the processor is present in a limited period of time or a required period of time. In this way, virtual memories have been suggested to overcome the above limitations.

In a conventional system using a virtual address, since the virtual address is different from a physical memory address, data which is in a consecutive data space on the virtual address does not necessarily correspond to a consecutive space of the physical memory address. For example, if a spacer of 10 MB is allocated using a function, such as a malloc function, in the system using the virtual address, the space of 10 MB is consecutively arranged in the virtual address, but the space of 10 MB is consecutively or inconsecutively divided in the physical memory address in the unit of page and dispersedly arranged on the memory.

If data programmed in the address, that is, data disposed in the space of 10 MB of the virtual address is copied to other physical memory space through an intellectual property (IP) core, the hardware IP core does not consecutively process data. If data is copied through direct memory access (DMA), the data can be copied within a consecutive stream of a physical memory address. It is because the data space is consecutive in the virtual address, but the data space is dispersed (or unaligned) in the physical memory address in the unit of page. Specifically, since the physical memory address is used in hardware, such as the IP core, within a system on chip (SoC), when the hardware IP operates, the virtual memory address has to be translated into the physical memory address to be used in a read and write process.

Therefore, when the hardware operates, a physically consecutive space is allocated and data is copied in a corresponding area to drive the hardware or scattering/gathering DMA iteratively performed in the unit of an inconsecutive space which is dispersed in the unit of page.

However, it is ineffective due to a dual copy that the physically consecutive space is allocated and the data is copied into the corresponding area. It may be impossible to ensure the physical consecutive space corresponding to the area according to the situation of a memory manager of an operating system and in this case, it has to wait in a stand-by state until a corresponding resource is ensured.

SUMMARY OF THE INVENTION

The present general inventive concept provides an image forming apparatus and method of translating a virtual memory address into a physical memory address in order to improve a delay in a data read and write process of reading and writing data or a translating process of translating the virtual memory address into the physical memory address.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including: a function unit to perform functions of the image forming apparatus, and a control unit to control the function unit to perform the functions of the image forming apparatus. The control unit includes a processor core to operate in a virtual memory address, a main memory to operate in a physical memory address and store data used in the functions of the image forming apparatus, and a plurality of input/output (I/O) logics to operate in the virtual memory address and control at least one of the functions performed by the image forming apparatus. Each of the plurality of I/O logics translates the virtual memory address into the physical memory address corresponding to the virtual memory address and accesses the main memory.

Each of the plurality of I/O logics may include a function core to control at least one of the functions performed by the image forming apparatus, an address translation unit to translate a virtual memory address required by the function core into a physical memory address using a translation look-aside buffer (TLB), and a direct memory access (DMA) to perform access using a translated physical memory address.

The address translation unit may return the physical memory address corresponding to the required virtual memory address within the TLB, if there is the required virtual memory address within the TLB.

The address translation unit may search a translation table within the main memory, update the TLB according to a searching result, and return the physical memory address corresponding to the required virtual memory address within the TLB updated, if there is no virtual memory address requested within the TLB.

Each of the plurality of I/O logics may further include an address prediction unit to predict a virtual memory address to be translated next requested by the function core according to a predetermined access pattern for image data of the image forming apparatus and update the TLB.

The address prediction unit may predict the virtual memory address to be requested next using a preset access pattern and search whether or not the physical memory address corresponding to the predicted virtual memory address is present in the translation table, if the predetermined access pattern is present.

The address prediction unit may determine whether or not previous prediction is accurate and change the predetermined access pattern if the previous prediction is not accurate.

The TBL may update address information for the virtual memory address and the physical memory address corresponding to the virtual memory address according to a storage order.

The TLB may be a cache memory.

The I/O core may be a function core to perform at least one of an image enlargement and reduction function, an image rotation function, an image translation function, and a scan function control, a facsimile function control, and a print function control.

The process core may translate the virtual memory address into the physical memory address corresponding to the virtual memory address and access the main memory.

The control unit may be a system on chip (SoC) including the process core, the plurality of I/O logics, and a bus interface to connect the logics within the control unit.

The foregoing and/or other aspects and utilities of the present general inventive concept may also be achieved by providing a method of translating a virtual memory address of an image forming apparatus into a physical memory address in an image forming apparatus, the method including: requesting an access of a main memory using a virtual memory address by an input/output (I/O) core which controls at least one of functions performed by the image forming apparatus, translating a virtual memory address requested by the I/O core into a physical memory address using a TLB, and performing an access using a translated physical memory address.

The translating the virtual memory address into the physical memory address may include returning the physical memory address corresponding to the requested virtual memory address within the TLB if there is the virtual memory address requested within the TLB.

The translating the virtual memory address into the physical memory address may include searching a translation table, updating the TLB according to a searching result, and returning the physical memory address corresponding to the requested virtual memory address using the updated TLB if the requested virtual memory address is not present within the TLB.

The translating the virtual memory address into the physical memory address may further include predicting a virtual memory address to be requested next by the function core according to an access pattern for image data of the image forming apparatus.

The predicting the virtual memory address may include predicting the virtual memory address to be requested next using a predetermined access pattern and searching whether or not a physical memory address corresponding to a predicted virtual memory address is present in the translation table, if the predetermined access pattern is present.

The predicting the virtual memory address may include searching a translation table within the main memory and updating the TLB according to a searching result, if the predicted virtual memory address is not present within the TLB.

The predicting the virtual memory address may include determining whether or not a previous prediction is accurate and changing the predetermined access pattern if the previous prediction is not accurate.

The TLB may update address information for the virtual memory address and the physical memory address corresponding to the virtual memory address according to a storage order.

The performing the access may include performing an access to the translated physical memory address through a DMA.

The foregoing and/or other aspects and utilities of the present general inventive concept may also be achieved by providing an image forming apparatus including a function unit to perform one or more functions of the image forming apparatus, a main memory to store data corresponding to at least one of the functions of the image forming apparatus, and a control unit having a plurality of input/output logics each to translate between a virtual memory address and a physical memory address, each to control the main memory in a write and read operation of the image forming apparatus according to the translated virtual or physical memory address, and each to control the function unit in a function performing operation of the image forming apparatus according to the data of the main memory.

The control unit may further include a process core connected to an external device to receive the data, and connected to the plurality of logics to process the data in a virtual memory address.

The control unit may further include a process core connected to an external device to receive the data, and connected to the plurality of logics to process the data in the virtual memory address.

The plurality of logics each may include an address translation unit to translate the virtual memory address and the physical memory address.

The plurality of logics may include semiconductor chips formed in an integrated body or package as a system on chip.

The plurality of logics may include semiconductor chips, at least one of the semiconductor chips may be formed in a printed circuit board, and remaining ones of the semiconductor chips may be stacked on the printed circuit board to form a system on chip or a system in package.

The plurality of logics may include an image processing input/output logic and a scan input/output logic to correspond to the functions of the image forming apparatus.

The main memory may be detachable attached to a housing of the image forming apparatus to be connected to the control unit.

The control unit may further include an address prediction element to store one or more patterns of one or more virtual memory addresses such that the physical memory address corresponding to the virtual memory address is provided according to one of the stored patterns.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1A:
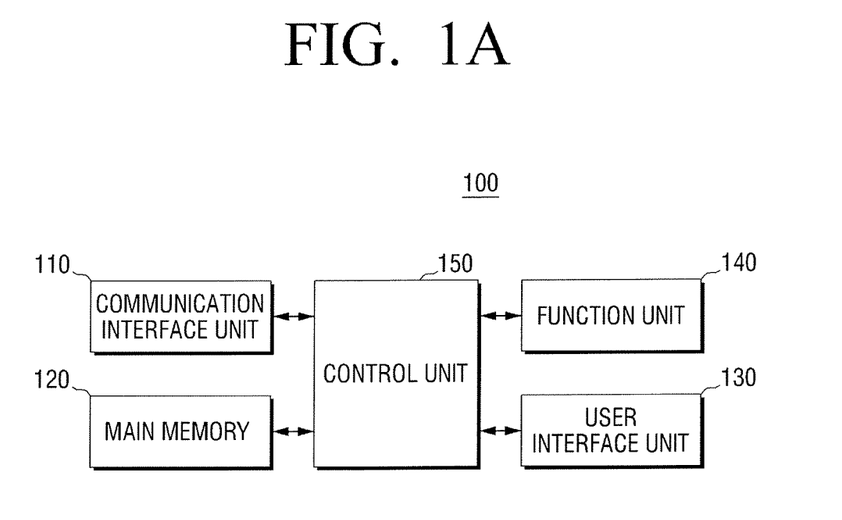
FIGS. 1A, 1B, and 1C are block diagrams illustrating an image forming apparatus according to an exemplary embodiment of the present general inventive concept.

FIG. 1A is a block diagram illustrating an image forming apparatus 100 according to an exemplary embodiment of the present general inventive concept.

Referring to FIG. 1A, the image forming apparatus 100 includes a communication interface unit 110, a main memory 120, a user interface unit 130, a function unit 140, and a control unit 150.

The communication interface unit 110 is formed to connect the image forming apparatus 100 to an external device, for example, a print control terminal (not illustrated). The communication interface unit 110 may connect the image forming apparatus 100 to the print control terminal using a wired or wireless communication, for example, a local area network (LAN), an Internet network, a universal serial bus (USB) port, and so on. The communication interface unit 110 may receive data, for example, job data, control data or commands from the print control terminal and transmit data, for example, job data or communication data, generated from the image forming apparatus 100 to the print control terminal.

The main memory 120 may store data used in functions of the image forming apparatus 100. The main memory 120 may store job data usable in a process of performing a function of a function unit 140 which will be described later. The main memory 120 may include a translation table (see 121 of FIG. 3) for a virtual memory address and a physical memory address. The main memory 120 may be implemented by a volatile random access memory (RAM) (i.e., a double data rate (DDR) RAM).

The main memory 120 may store data received from an external device through the communication interface unit 110 such that the stored data can be used to perform the function of the function unit 140 of the image forming apparatus 100. It is possible that the main memory 120 may store data generated from the function unit when the function unit has a function to generate the data, for example, a scanning function to scan a number of documents or images, to generate a large amount of data to be stored in the main memory 120 and/or to transmit the stored data to an external device through the communication interface unit.

The user interface unit 130 may include a plurality of function keys by which a user can set or select one or more functions supported by the image forming apparatus 100 and display information corresponding to functions provided by the image forming apparatus 100 and communication with an external device. The user interface unit 130 may be implemented by combining a monitor and a mouse or by an apparatus in which an input and an output are simultaneously implemented, such as a touch pad.

The function unit 140 performs functions of the image forming apparatus 100 such as copy, print, scan, facsimile transmission, or facsimile reception. The function unit 140 may include a copy processing unit to perform a copy function, a print processing unit to perform a print function, a scan processing unit to perform a scan function, a facsimile processing unit to perform a facsimile transmission and reception function, and an image processing unit to convert an image.

The function unit 140 may receive data corresponding to an image from the memory unit 120 under control of the control unit 150 and print the data on a print medium. The function unit 140 may print a large amount of data corresponding to a large number of pages since the control unit 150 efficiently controls the memory unit 140 by reading data from the memory unit 120 and transmitting the data to the function unit 140.

The control unit 150 performs control for each configuration of the image forming apparatus 100. The control unit 150 may be a system on chip (SoC) which includes a plurality of input/output (I/O) logics or a plurality of intellectual properties (IPs) which divide and control functions supported by the image forming apparatus 100, a processor core, and a bus interface to connect the logics within the control unit 150. A configuration and operation of the control unit 150 will be described with reference to FIG. 2. Here, the SoC is a chip in which exist parts which have been previously developed as a hardware semiconductor design property (IP or I/O logic), such as a semiconductor die, a passive device, a filter and antenna, and a battery, are integrated within a three-dimensional (3D) package.

The Soc may be a single monolithic body or an integrated package and also have external terminals to be connected to one or more external unit of the image forming apparatus 100, for example, the communication interface unit 110, the main memory 120, the user interface unit 130, and the function unit 140.

Figure 1B:
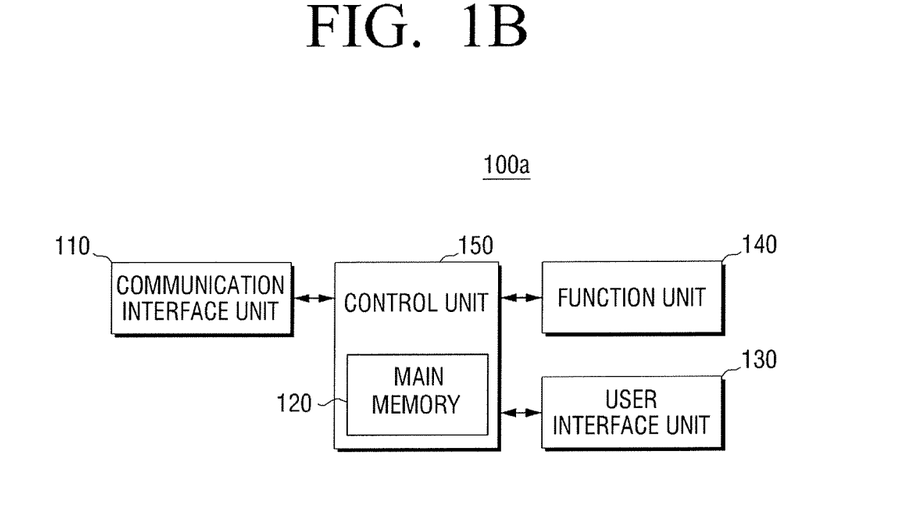
Figure 1C:
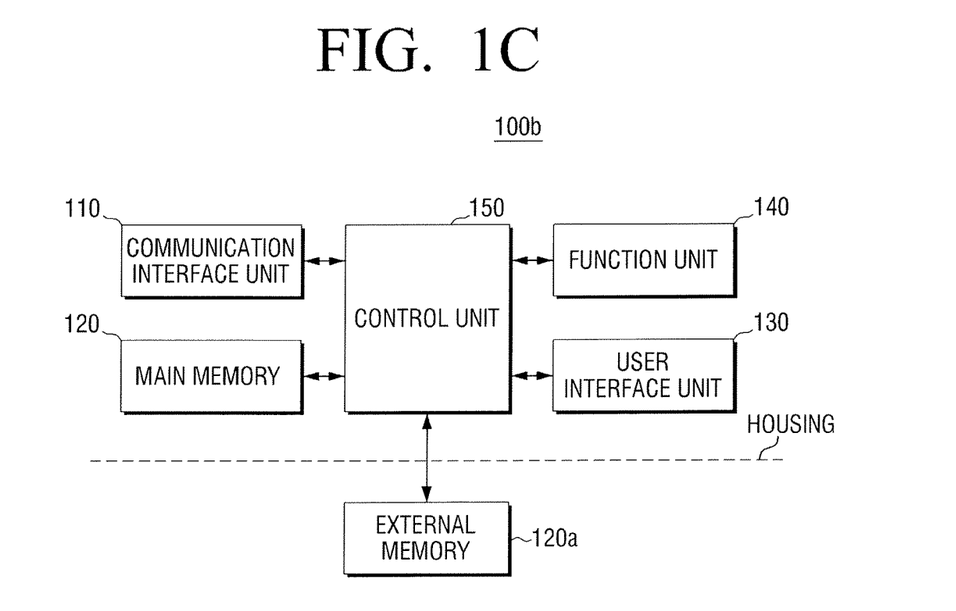

Although FIG. 1A illustrates the main memory 120 and the control unit 150 which are separately constituted and connected through terminals, a main memory may be embedded within the control unit 150 in an image forming apparatus 100b as illustrated in FIG. 1B. The main memory may correspond to the main memory 120 of FIG. 1A. The main memory may be an additional memory to the main memory 120 of FIG. 1A FIG. 1C illustrated an image forming apparatus 100c having a connection with an external memory 120a. The external memory 120a is detached from and attached to a connection terminal or port formed on a housing of the image forming apparatus 100b. The external memory 120a may correspond to the main memory 120. The control unit 150 may store data, which is received from an external device or generated from an image scanning or processing process, in at least one of the main memory 120 and external memory 120a and read data from at least one of the main memory 120 and external memory 120a and transmit the read data to the function unit 140 or an external device, upon detection of an attachment state of the external memory 120a. It is possible that the control unit 150 store data or read from the external memory 120a to correspond to a function of the function unit 140.

Figure 2:
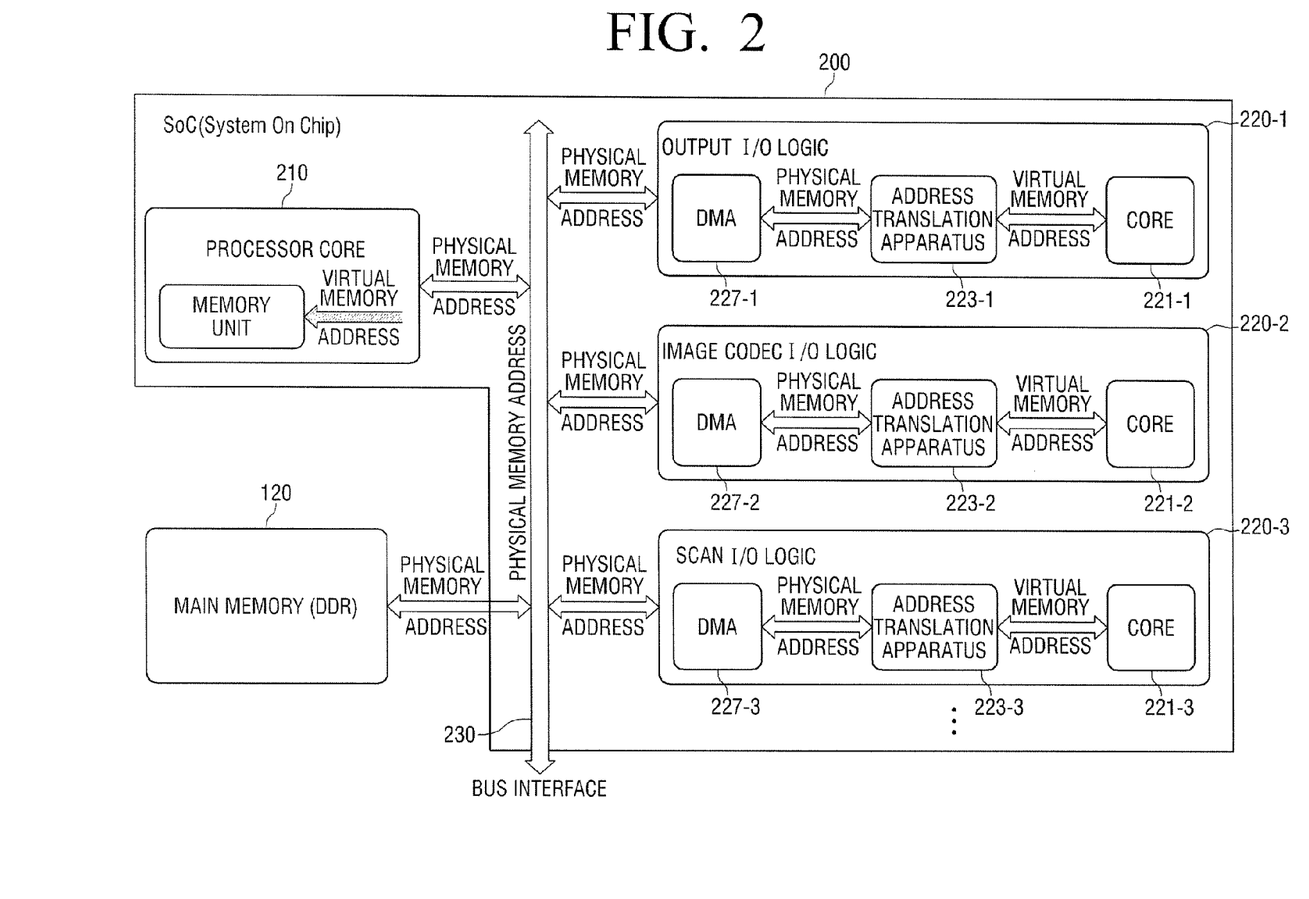
FIG. 2 is a view specifically illustrating a configuration of a control unit of FIG. 1A.

FIG. 2 is a view illustrating a configuration of a control unit in FIG. 1.

Referring to FIG. 2, a control unit 200 (corresponding to 150 of FIG. 1) includes a processor core 210, a plurality of I/O logics 220 (that is, 220-1, 220-2, and 220-3) and a bus interface 230.

The processor core 210 performs control for the plurality of I/O logics 220. The processor core 210 performs an operation corresponding to a command stored in the main memory 120. Since the command stored in the main memory 120 is in a virtual memory address, the processor core 210 operates in the virtual memory address. When the processor core 210 accesses the main memory 120 or the plurality of I/O logics, the processor core 210 may translate the virtual memory address into a physical memory address using a memory management unit (MMU) to access the main memory 120 or the plurality of I/O logics. Here, the MMU may translate a virtual memory address used in the processor core 210 into a physical memory address and manage the processor core 210 to access the main memory 120 or a peripheral apparatus.

The I/O logic 220 is a processor to control at least one of functions supported by the image forming apparatus. The I/O logic 220 may control one of the above-described processing units of the function unit 140 using data to be stored in or read from the memory unit 120. For example, the I/O logic 220 may include an output I/O logic 220-1 to control a print processing unit to perform a printing operation of the image forming apparatus 100, an image codec I/O logic 220-2 to control an image processing unit to process or decode data or codec received from an external device or to form data or codec in the image forming apparatus 100, a scan I/O logic 220-3 to control a facsimile or scanning processing unit to scan an image or document in the image forming apparatus 100, and the like. Although only three I/O logics have been illustrated in the exemplary embodiment, the I/O logic 220 may be implemented by adding I/O logics to perform operations other than the above-described functions. The I/O logic 220 may include a logic core or a function core (221 of FIG. 3 or an IP core), an address translation apparatus (ATA or MMU) (223 of FIG. 3), and a direct memory access DMA (227 of FIG. 3).

Figure 3:
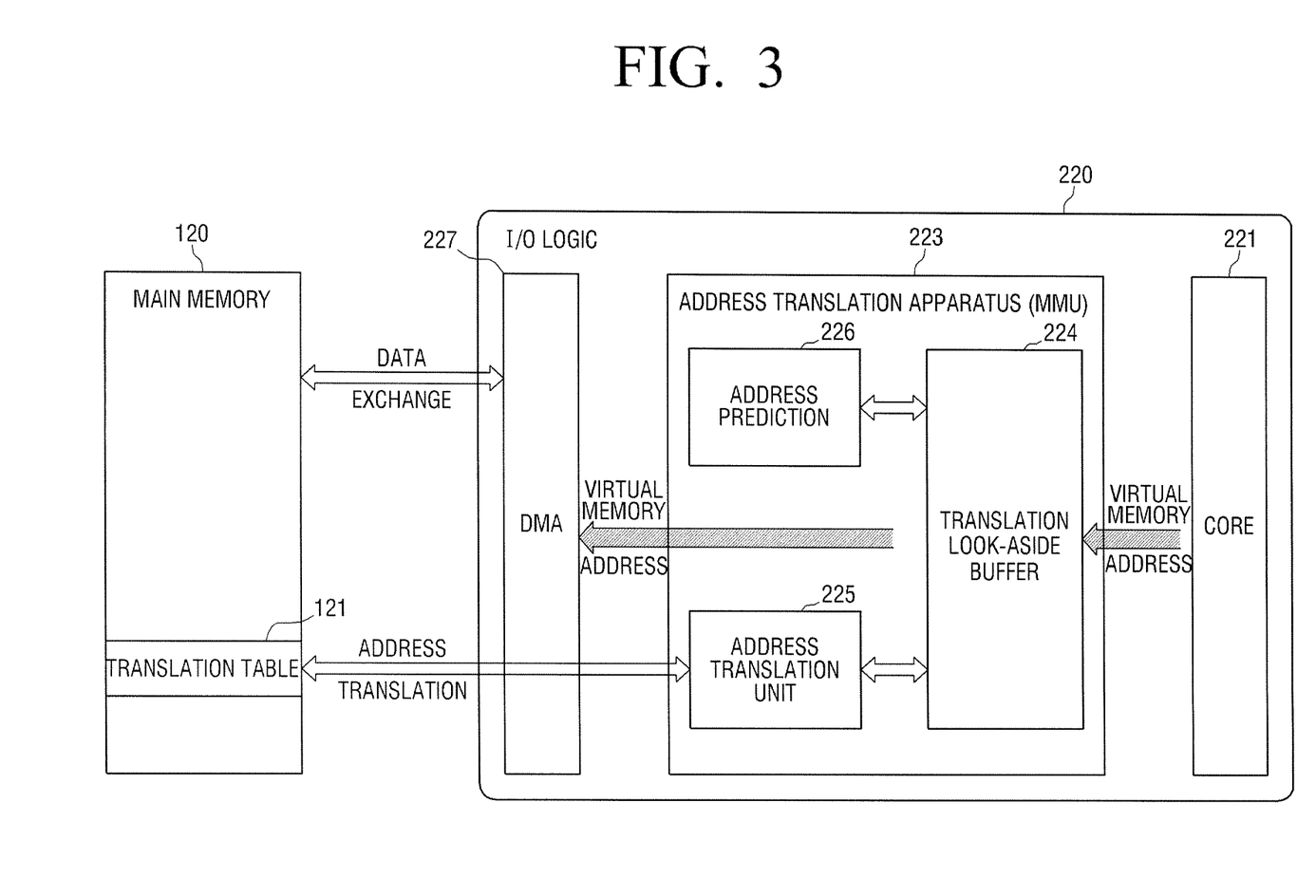
FIG. 3 is a view specifically illustrating an address translation device of FIG. 2.

The function core 221 (that is, 221-1, 221-2, and 221-3) is a processor core to control at least one predetermined function (that is, function of the function unit 140) of functions supported by the image forming apparatus and performs to process and manage data stored in the main memory 120. Since the function core 221 according to the exemplary embodiment may operate based on a virtual memory address, the address translation apparatus 223 automatically translates the virtual memory address into a physical memory address to access a memory space of the memory unit 120 to perform the corresponding function of the image forming apparatus 100.

The address translation apparatus 223 (that is, 223-1, 223-2, and 223-3) translates a virtual memory address requested by the function core 221 into a physical memory address and predicts a virtual memory address to be requested next by the function core 221. A configuration and operation of the address translation apparatus 223 will be described with reference to FIG. 3 below. Although only the operation of translating the virtual memory address into the physical memory address by the address translation apparatus 223 has been illustrated in the exemplary embodiment, the present general inventive concept is not limited thereto. The address translation apparatus 223 may also perform an operation of translating a physical memory address into a virtual memory address to correspond to a memory space of the main memory 120 to provide the function of the image forming apparatus 100.

The DMA 227 (that is, 227-1, 227-2, and 227-3) receives and transmits data from and to the main memory 120. The DMA 227 may receive and transmit the data from and to the main memory 120 based on the physical memory address translated by the address translation apparatus 223.

The bus interface 230 is a channel to connect between the I/O logic, the processor core, and the main memory 120 within the control unit 200 and communication between all the connected apparatuses operates based on the physical memory address. The bus interface 230 may have a terminal or port to be connected to a terminal of the main memory unit 120.

The processor core 210 and the logics 220 (220-1, 220-2, 220-3) may be semiconductor chips integrated or packaged in a single body as a Soc (system on chip) or Sic (system in semiconductor). The semiconductor chips are stacked on one another, and at least one of the stacked semiconductor chips may include a terminal (solder ball) or port to be connected to an external unit, for example, the communication interface unit 110, the user interface unit 130, and the function unit 140.

It is possible that at least one of the processor core 210 and the logics 220 (220-1, 220-2, 220-3) can be formed in a printed circuit board and that the remaining of the processor core 210 and the logics 220 (220-1, 220-2, 220-3) can be stacked on the printed circuit board in a single body. In this case, the printed circuit board is formed with a terminal or port to be connected to an external unit, for example, the communication interface unit 110, the user interface unit 130, and the function unit 140.

FIG. 3 is a view illustrating a configuration of the address translation apparatus 223 according to an exemplary embodiment of the present general inventive concept.

Referring to FIG. 3, the address translation apparatus 223 includes a translation look-aside buffer (TLB) 224, an address translation unit 225, and an address prediction unit 226.

The TLB 224 stores address information for one or more virtual memory addresses and one or more physical memory addresses corresponding to the virtual memory addresses in a look-up table form in an address translation operation. The TLB 224 may update the address information according to a storage order of the main memory 120. The TLB 224 may implemented by a cache memory to rapidly perform translation between the virtual memory address and the physical memory address in an address translation operation.

The address translation unit 225 translates the virtual memory address into the physical memory address in an address translation operation. The address translation unit 225 may determine whether or not the virtual memory address requested by the function core 221 is present in the TLB 224.

As a determination result, when the virtual memory address requested by the function core 221 is present in the TLB 224, the physical memory address corresponding to the requested virtual memory address may be returned by the address translation unit 225 to provide an access to the main memory 120 or process data relating to the physical memory address corresponding to the requested virtual memory address.

On the other hand, when the virtual memory address requested is not present in the TLB 224, the TBL 224 may generate a notice to the address translation unit 225, and the address translation unit 225 may search a translation table 121 of the main memory 120, extracts address information, such as a physical memory address corresponding to the requested virtual memory address, from the translation table 121 of the main memory 120, and records extracted address information in the TLB 224, thereby updating the TLB 224 with the address received from the main memory 120.

The physical memory address corresponding to the requested virtual memory address may be returned by the address translation unit 225 using the updated TLB 224. On the other hand, when the requested virtual memory address cannot be translated through the translation table 121 of the main memory 120 or an access to the main memory 120 cannot be performed, the address translation unit 225 may regard the address translation to be failed and generate exceptional processing.

The address prediction unit 226 predicts a virtual memory address to be requested next according to a predetermined pattern. The address prediction unit 226 predicts the virtual memory address to be requested next and stores address information for a predicted virtual memory address in the TLB 224 in advance to increase an accurate rate of the TLB 224.

More specifically, the address prediction unit 226 determines whether or not an address translation operation is previously performed. As a determination result, when the address translation operation is not previously performed (that is, when a first address translation operation is performed), it may not easy to predict a pattern and the address prediction unit 226 stores currently requested virtual memory address information without a separation prediction.

However, when the address translation operation has been previously performed, the address prediction unit 226 determines whether or not there is a history in which the address prediction operation has been previously performed and determines whether or not the address prediction performed is accurate if the address prediction operation is previously performed. When the address translation operation has been previously performed and the previous prediction is accurate, the address prediction unit 226 may calculate a virtual memory address using the pattern used in the previous prediction according to a next request for the address translation operation.

When the address prediction has not been previously performed and the previous prediction is not accurate, the address prediction unit 226 may determine a new pattern and calculate the virtual memory address using the newly determined according to a next request for the address translation operation.

The pattern used in the exemplary embodiment is associated with a data access characteristic of the image forming apparatus 100. The image forming apparatus may have a sequential data access or inversely sequential data access in an image forming process, and a random access case may not be frequently occurred in the image forming apparatus. The virtual memory address of the next request may be calculated using the sequential data access or inversely sequential data access in the image forming process. One or more patterns may be stored in the address prediction unit 226, and the address prediction unit 226 may select and use any one of pre-stored patterns according to a request pattern of the function core 221.

When patterns between the previously requested virtual memory address and the currently requested virtual memory address are not consistent or same, it may be impossible to predict the virtual memory address of a next request. That is, prediction for a complicate address pattern actually takes a long time, thereby to cause degradation of performance and a waste of a memory space according to pattern storage. Therefore, the address prediction unit 226 according to the exemplary embodiment can predict the virtual memory address to be requested next using a sequential access type pattern due to increase or reduction in the unit of a specific block or image line.

When the virtual memory address to be requested next is calculated, the address prediction unit 226 records a calculated virtual memory address and a physical memory address corresponding to the calculated virtual memory address in the TLB 224. When the calculated virtual memory address is not present in the TLB 224, the address prediction unit 226 may search the translation table 121 within the main memory 120 for the virtual memory address and physical memory address, extract address information, such as the requested virtual memory address and the physical memory address corresponding to the requested virtual memory address from the translation table 121, and record extracted address information in the TLB 224.

As described above, the address translation apparatus 223 according to the exemplary embodiment can automatically translate the virtual memory address requested by the I/O logic into the physical memory address. The address translation apparatus 223 predicts the virtual memory address to be requested next and stores the address information corresponding to a predicted virtual memory address in the TLB 224 in advance, so that a time required for translating the virtual memory address into the physical memory address can be reduced.

Figure 4:
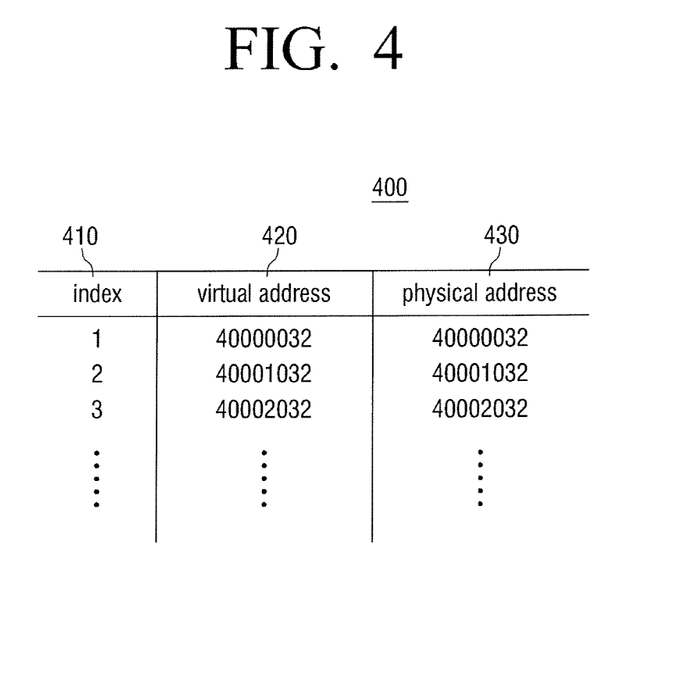
FIG. 4 is a view illustrating a format of a translation lookaside table according to an exemplary embodiment of the present general inventive concept.

FIG. 4 is a view illustrating a format of a translation look-aside table 400 according to an exemplary embodiment of the present general inventive concept.

Referring to FIG. 4, the translation look-aside table 400 may correspond to translation look-aside buffer 224 of FIG. 3, and may include an index 410, a virtual memory address 420, and a physical memory address 430 as a look-up table. Although the format including the index 410 has been illustrated in the exemplary embodiment, the translation look-aside table 400 may be implemented by a format including other configurations. The translation look-aside table 400 may be implemented by a cache memory.

Figure 5:
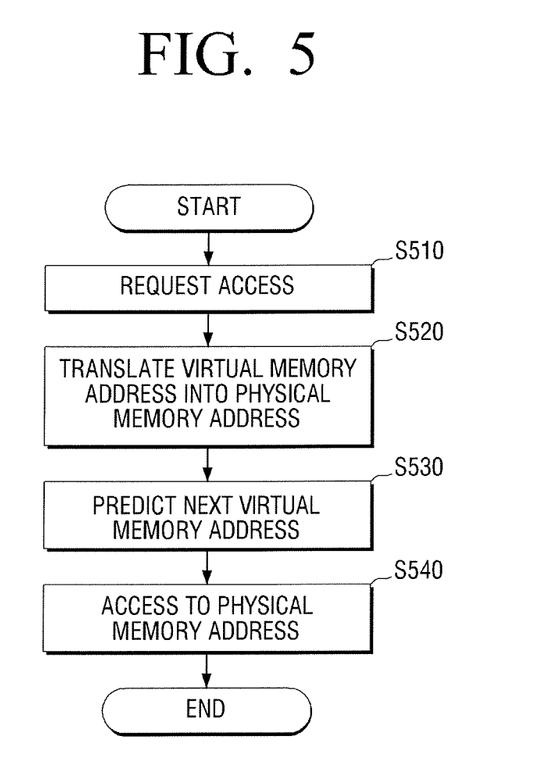
FIG. 5 is a flowchart illustrating a method of translating a virtual memory address into a physical memory address according to an exemplary embodiment of the present general inventive concept.

FIG. 5 is a flowchart illustrating a method of translating a virtual memory address into a physical memory address according to an exemplary embodiment of the present general inventive concept.

A function core which controls at least one function of functions performed by the image forming apparatus requests an access to a virtual memory address at operation S510.

In response to the access request, a requested virtual memory address is translated into a physical memory address using the TLB 224 at operation S520. An operation of translating the virtual memory address into the physical memory address using the TLB 224 will be described with reference to FIG. 6 below.

A virtual memory address to be requested next is predicted according to a predetermined pattern at operation S530. A specific operation of predicting the virtual memory address to be requested next will be described with reference to FIG. 7 below.

The function core accesses to a translated physical memory address at operation S540. The function core may access to the translated physical memory address through the DMA.

Figure 6:
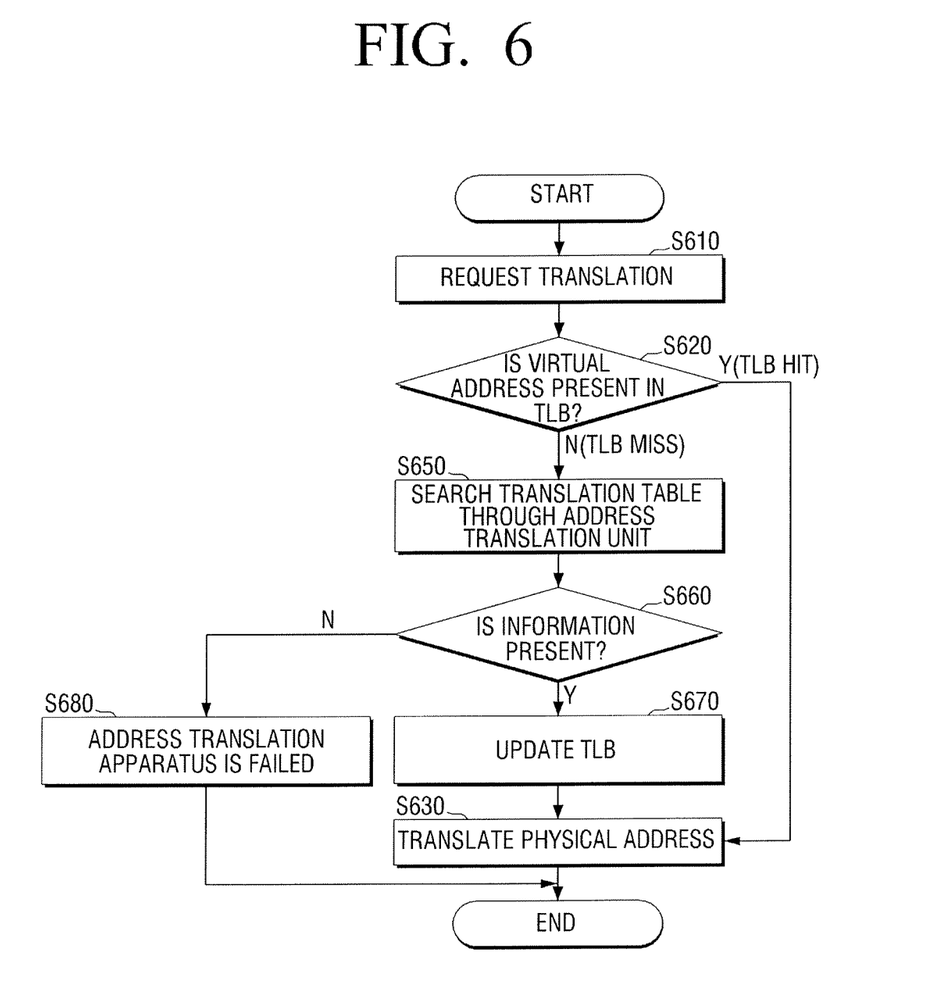
FIG. 6 is a flowchart illustrating a translation process of FIG. 5.

FIG. 6 is a flowchart specifically illustrating a translation process corresponding to operation 520 of FIG. 5 according to an embodiment of the present general inventive concept.

When an address translation request is received from the function core at operation S610, it determines whether or not the requested virtual memory address is present in the TLB at operation S620.

As a determination result, if the requested virtual memory address is present in the TLB 224, the physical memory address corresponding to the requested virtual memory address within the TLB 224 is returned at operation S630.

When the requested virtual memory address is not present in the TLB 224, it searches the translation table 121 within the main memory 120. If information of the requested virtual memory address is present in the translation table 121, the TLB 224 is updated using searched address information of the translation table 121 at operation S670. The physical memory address corresponding to the requested virtual memory address is returned using the updated TLB. If information of the requested virtual memory address is not present in the translation table 121, it is determined that the address translation apparatus is failed at operation S680.

Figure 7:
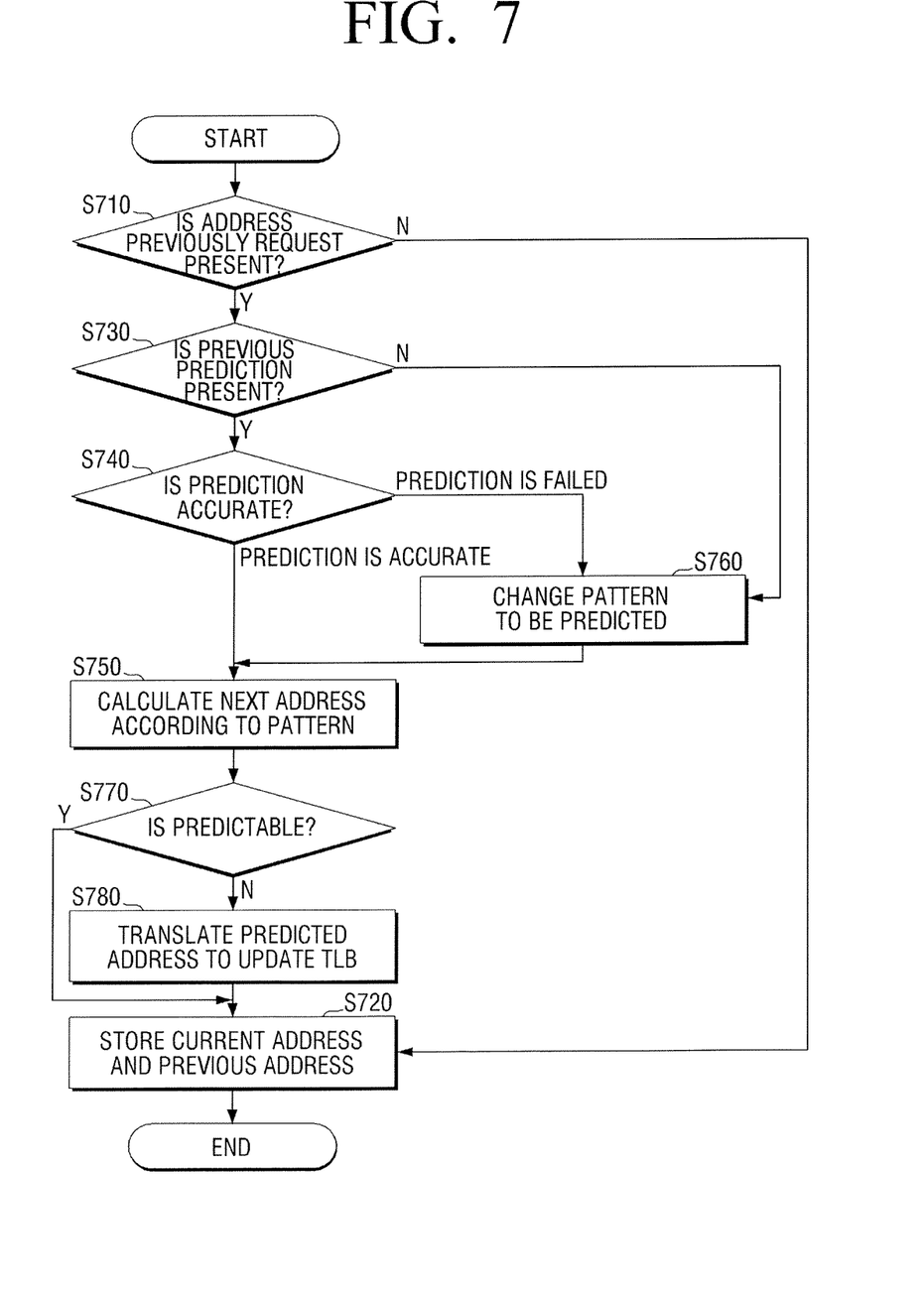
FIG. 7 is a flowchart illustrating a prediction process of FIG. 5.

FIG. 7 is a flowchart specifically illustrating a prediction process corresponding to operation 530 of FIG. 5 according to an exemplary embodiment.

Referring to FIG. 7, it is determined whether or not an address previously requested is present at operation S710. As a determination result, if the address is not previously translated (that is, in case of first address translation), it is not easy to predict a pattern so that virtual memory address information currently requested may be stored without separation prediction at operation S720.

If the address is previously translated, it is determined whether or not previous prediction is present at operation S730 and then determined whether or not the previous prediction is accurate at operation S740. It may be determined whether or not a pattern has been present and a predetermined pattern is accurate so that it is determined whether or not it is possible to predict an address using a previously used pattern.

As a determination result, if the previous prediction is present and the previous prediction is accurate, a virtual memory address to be requested next is calculated using a pattern used in the previous prediction at operation S750. A specific operation of calculating the virtual memory address to be requested next has been described in connection with the address prediction unit 226 of FIG. 3 and thus detail descriptions thereof will be omitted.

If the previous prediction is not present and the previous prediction is not accurate, a new pattern is decided at operation S760 and a virtual memory address to be requested next may be calculated using a new decided pattern.

It determines whether or not information for the calculated virtual memory address is present in the TLB 224 at operation S770. As a determination result, if the calculated virtual memory address is not present in the TLB (N in operation S770), it searches the translation table 121 within the main memory 120, extracts address information such as the requested virtual memory address within the translation table 121 and the physical memory address corresponding to the virtual memory address, and records extracted address information in the TLB 224.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Therefore, the method of translating the virtual memory address into the physical memory address according to the exemplary embodiment predicts the virtual memory address to be requested next in advance and stores address information corresponding to the virtual memory address to be requested next in the TLB so that a time required to translate the virtual memory address into the physical memory address can be reduced. The methods of translating the virtual memory address into the physical memory address as described in FIGS. 5 to 7 may be implemented on the image forming apparatus having the configuration of FIG. 1 as well as image forming apparatuses having other configurations.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of translating a virtual memory address into a physical memory address in an image forming apparatus, the method comprising:
 requesting an access of a main memory using a virtual memory address by an input/output (I/O) core which controls at least one of functions performed by the image forming apparatus with image data stored in the main memory;
 translating the virtual memory address requested by the I/O core into a physical memory address using a translation look-aside buffer (TLB) and by predicting the virtual memory address to be requested next by the function core according to an access pattern for the image data of the image forming apparatus; and
 performing an access corresponding to the image data of the main memory using a translated physical memory address.

2. The method of claim 1, wherein the translating the virtual memory address into the physical memory address includes returning the physical memory address corresponding to the requested virtual memory address within the TLB if the requested virtual memory address exists within the TLB.

3. The method of claim 1, wherein the translating the virtual memory address into the physical memory address includes:
 if there is no information on the requested virtual memory address within the TLB,
 searching a translation table of the main memory;
 updating the TLB according to a searching result; and
 returning the physical memory address corresponding to the requested virtual memory address using the updated TLB.

4. The method of claim 1, wherein the predicting of the virtual memory address includes:
 if a predetermined access pattern is present,
 predicting the virtual memory address to be requested next using the predetermined access pattern; and
 searching whether or not the physical memory address corresponding to the predicted virtual memory address is present in the translation table.

5. The method of claim 1, wherein the predicting the virtual memory address includes:
    if the predicted virtual memory address is not present within the TLB,
        searching a translation table of the main memory; and
        updating the TLB according to a searching result.

6. The method of claim 1, wherein the predicting of the virtual memory address includes:
    determining whether or not a previous prediction is accurate; and
    changing the predetermined access pattern if the previous prediction is not accurate.

7. The method of claim 1, wherein the TLB updates address information for the virtual memory address and the physical memory address corresponding to the virtual memory address according to a storage order.

8. The method of claim 1, wherein the performing the access includes performing an access to the translated physical memory address through a DMA.

* * * * *

UNITED STATES PATENT AND TRADEMARK OFFICE
CERTIFICATE OF CORRECTION

| | | |
|---|---|---|
| PATENT NO. | : 8,711,418 B2 | Page 1 of 1 |
| APPLICATION NO. | : 13/209712 | |
| DATED | : April 29, 2014 | |
| INVENTOR(S) | : Byoung-tae Cho | |

It is certified that error appears in the above-identified patent and that said Letters Patent is hereby corrected as shown below:

On the Title Page: Add
Item (30) Foreign Application Priority Data:
August 16, 2010     (KR)     10-2010-0078820

Signed and Sealed this
First Day of July, 2014

Michelle K. Lee
*Deputy Director of the United States Patent and Trademark Office*